United States Patent Office.

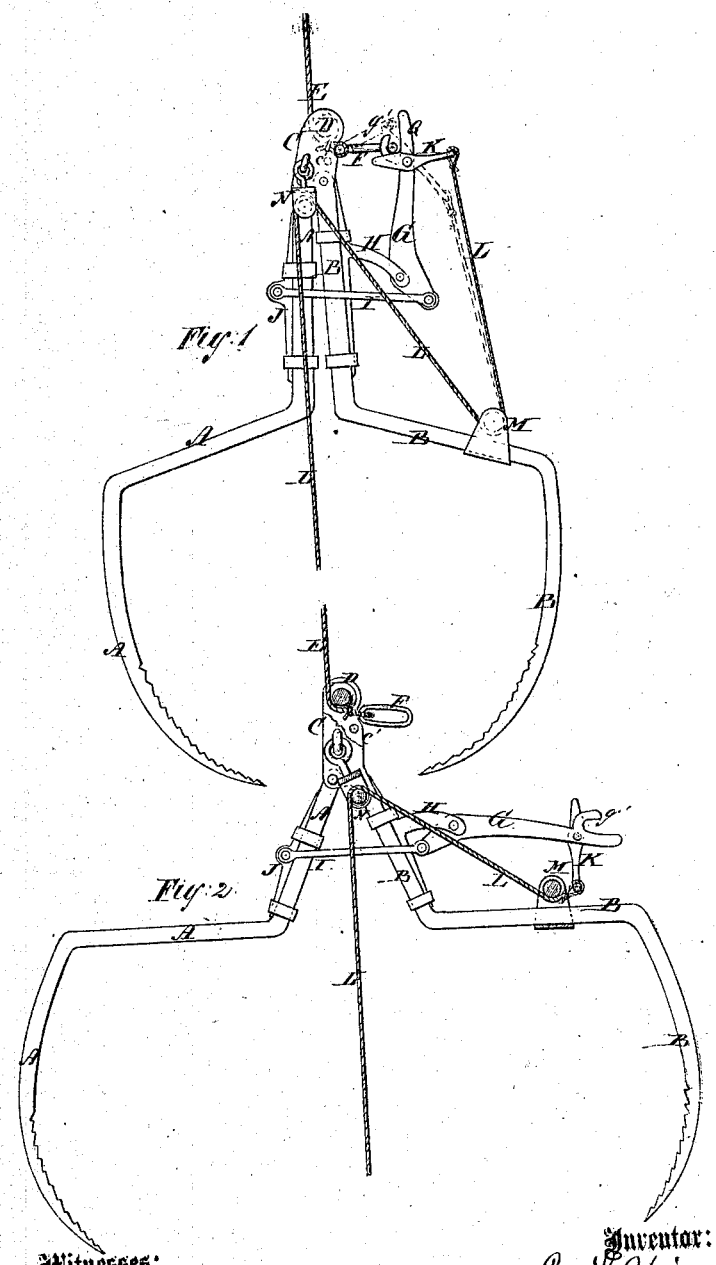

JOHN S. YINGER, OF MANCHESTER, PENNSYLVANIA.

Letters Patent No. 104,529, dated June 21, 1870.

IMPROVEMENT IN HORSE HAY-FORKS.

The Schedule referred to in these Letters Patent and making part of the same.

*To all whom it may concern:*

Be it known that I, JOHN S. YINGER, of Manchester, in the county of York and State of Pennsylvania, have invented a new and useful Improvement in Horse Hay-Forks, the same being more especially designed as an improvement on the horse hay-fork for which Letters Patent of the United States were granted to me December 29, 1868; and I do hereby declare that the following is a full, clear, and exact description thereof, which will enable others skilled in the art to make and use the same, reference being had to the accompanying drawing forming part of this specification.

Figure 1 is a side view of my improved fork in position for raising hay.

Figure 2 is a side view of the same in position for being thrust into the hay.

Similar letters of reference indicate corresponding parts.

My invention has for its object to furnish an improved horse hay-fork, which shall be simple in construction, strong, durable, not liable to get out of order, and conveniently operated; and It consists in the construction and combination of the various parts of the fork, as hereinafter more fully described.

A and B are the tines of the fork, which are made in about the shape shown in figs. 1 and 2, that is to say, their lower parts are curved, as shown, and their inner or concave sides, toward their points, are corrugated or notched. The middle parts of the tines A B are straight, and incline slightly upward from the lower or curved parts of the tines to their upper parts or shanks.

The shanks of the tines A B extend upward, nearly parallel with each other, when the fork is closed, and their upper ends are pivoted to and between the lower ends of the plates C, between the upper ends of which is pivoted a concave roller, D, around which the hoisting-rope E passes.

The hoisting-rope E is kept in contact with the roller D, and is kept from coming in contact with the pivoted upper ends of the tines A B, by a rivet, c', which also serves to connect and strengthen the plates.

The edges of the plates C are notched upon one side to receive the ring F, attached to the lower end of the hoisting-rope E, to more securely hold the said ring in place.

G is the lock-lever, upon the inner side of the upper end of which is formed a hook, g', to receive the spring F, as shown in fig. 1.

The lever G is pivoted, near its lower end, to a bracket, H, the base of which extends along the outer edge of the shank of the tine B, where it is secured in place by bands passing around it, and around the said shank of the tine B.

To the lower ends of the lever G are pivoted the bars or rods I, which pass across to the opposite sides of the shanks of the tines A B, and are pivoted to the eye of the eye-plate J, which passes along the outer edge of the shank of the tine A, and is secured in place by bands passing around it, and around the said shank of the tine A.

To the upper part of the side of the lever G, just at the base of the hook g', is pivoted a small trip-lever, K, to the outer end of which is attached the end of the trip-rope L.

The trip-rope L passes around a pulley, M, pivoted to the middle part of the tine B, near the curved lower part of the tine B.

The trip-rope L passes over a pulley, N, swiveled to the plate C, and it is extended into such a position that it may be conveniently reached and operated by the operator.

It should be observed that the upper ends of the plates C are curved a little toward the lock-lever G, to bring the hoisting-rope E, when supporting the fork, directly above the center of said fork.

In using the fork, the tines A B are spread apart into the position shown in fig. 2, and are thrust to the desired depth into the hay. The ring F is then hooked upon the hook g' of the lever G, and the horse is started up. As the hoisting-rope E is drawn, the first effect is to draw the lever G into the position shown in fig. 1, closing the tines until the sides of the ring F rest against the edges of the plates C. As the hoisting-rope continues to be drawn upon, the loaded fork will be raised and transported to the place where the hay is to be deposited. The trip-rope L is then drawn upon, which operates the trip-lever K, and raises the ring F out of the hook g' of the lever G, allowing the weight of the hay to spread the tines A B, and drop to its place. The fork is then drawn back by the trip-rope L, to be again loaded.

Having thus described my invention,

I claim as new and desire to secure by Letters Patent—

1. The arrangement, with the plates C and the upper ends of the shanks of the tines A and B, of the hooked lever G, trip-lever K, connecting-rod I, bracket H, and eye-plate J, as shown and described.

2. An improved horse hay-fork, formed by the combination of the tines A B, plates C, concave roller D, ring F, hooked lever G g', bracket H, connecting-rods or bars I, eye-plate J, trip-lever K, and pulleys M N with each other, said parts being constructed and operating substantially as herein shown and described, and for the purpose set forth.

JOHN S. YINGER.

Witnesses:
HACK KRAFFT,
M. L. DUHLING.